United States Patent
Musters

(10) Patent No.: US 8,973,874 B2
(45) Date of Patent: Mar. 10, 2015

(54) WING FOR GENERATING LIFT FROM AN INCIDENT FLOW

(75) Inventor: Robert Jan Musters, Enschede (NL)

(73) Assignee: B.V. Green X, Enschede (NL)

( * ) Notice: Subject to any disclaimer, the term of this patent is extended or adjusted under 35 U.S.C. 154(b) by 156 days.

(21) Appl. No.: 13/640,976

(22) PCT Filed: Apr. 14, 2011

(86) PCT No.: PCT/NL2011/050253
§ 371 (c)(1),
(2), (4) Date: Dec. 10, 2012

(87) PCT Pub. No.: WO2011/129696
PCT Pub. Date: Oct. 20, 2011

(65) Prior Publication Data
US 2013/0068894 A1 Mar. 21, 2013

(30) Foreign Application Priority Data
Apr. 15, 2010 (NL) .................................. 2004555

(51) Int. Cl.
*B64C 9/00* (2006.01)
*B64C 21/10* (2006.01)
(Continued)

(52) U.S. Cl.
CPC ............ *B64C 3/38* (2013.01); *A63H 27/008* (2013.01); *B64C 3/10* (2013.01); *B64C 23/00* (2013.01); *B64C 33/02* (2013.01); *B64C 2201/025* (2013.01); *F01D 5/12* (2013.01)
USPC ........................................ 244/201; 244/200.1

(58) Field of Classification Search
USPC ................... 244/201, 211, 203, 213
See application file for complete search history.

(56) References Cited

U.S. PATENT DOCUMENTS

| | | | |
|---|---|---|---|
| 4,739,957 A | | 4/1988 | Vess et al. |
| 5,697,468 A | * | 12/1997 | Russell et al. ................ 180/116 |
| 2004/0056149 A1 | * | 3/2004 | Pines et al. ...................... 244/11 |
| 2006/0284022 A1 | * | 12/2006 | Harrigan et al. .............. 244/203 |
| 2007/0131819 A1 | | 6/2007 | Winston |

FOREIGN PATENT DOCUMENTS

| | | |
|---|---|---|
| DE | 657856 | 3/1938 |
| DE | 18 13 311 | 7/1970 |

(Continued)

OTHER PUBLICATIONS

International Publication WO 2011/129696 A3 including International Search Report Application No. PCT/NL2011/050253 dated Oct. 13, 2011, 4 pages.

(Continued)

*Primary Examiner* — Valentina Xavier
(74) *Attorney, Agent, or Firm* — Thomas|Horstemeyer, LLP

(57) ABSTRACT

The invention relates to a wing for generating lift and comprises a trailing edge, a leading edge, an inner end, an outer end, a top surface and a bottom surface. The wing comprises an aerofoil with a chord line and a span direction. The leading edge comprises a kink between the inner end and the outer end. The leading edge comprises a forward sweep part between the inner end and the kink extending towards the kink presenting an angle relative to the span direction. The leading edge comprises a backward sweep part between the kink and the outer end extending from the kink presenting an angle relative to the span direction. The top surface comprises a flow control means for controlling the lift at least partly located between a leading edge part between the kink and the outer end and located between the leading edge and the trailing edge.

16 Claims, 4 Drawing Sheets

(51) Int. Cl.
*B64C 3/38* (2006.01)
*A63H 27/00* (2006.01)
*B64C 3/10* (2006.01)
*B64C 23/00* (2006.01)
*B64C 33/02* (2006.01)
*F01D 5/12* (2006.01)

(56) References Cited

FOREIGN PATENT DOCUMENTS

| | | |
|---|---|---|
| EP | 1 557 354 | 7/2005 |
| FR | 417.502 | 11/1910 |
| FR | 589.848 | 6/1925 |
| JP | 2005-206148 A2 | 8/2005 |
| RU | 2266233 | 12/2005 |
| WO | WO 2008/125868 | 10/2008 |

OTHER PUBLICATIONS

Search Report and Written Opinion of the NL priority application 2004555 dated Jan. 10, 2011, 6 pages.

Katz et al., "Flight investigation at Mach numbers from 0.8 to 1.4 to determine the zero-lift drag of wings with 'M' and 'W' plan forms," Langley Aeronautical Laboratory, National Advisory Committee for Aeronautics, Sep. 18, 1950, 25 pages.

* cited by examiner

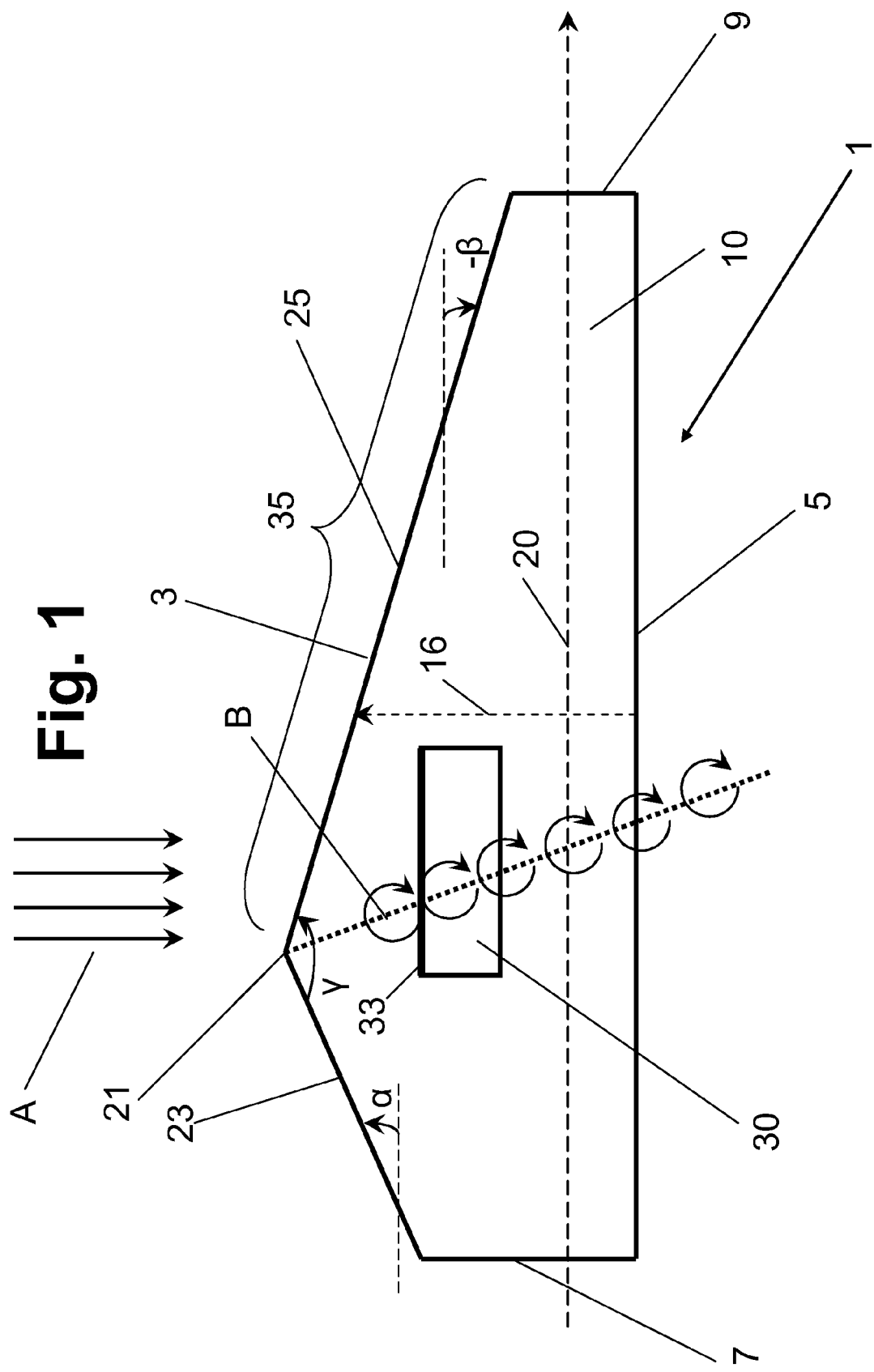

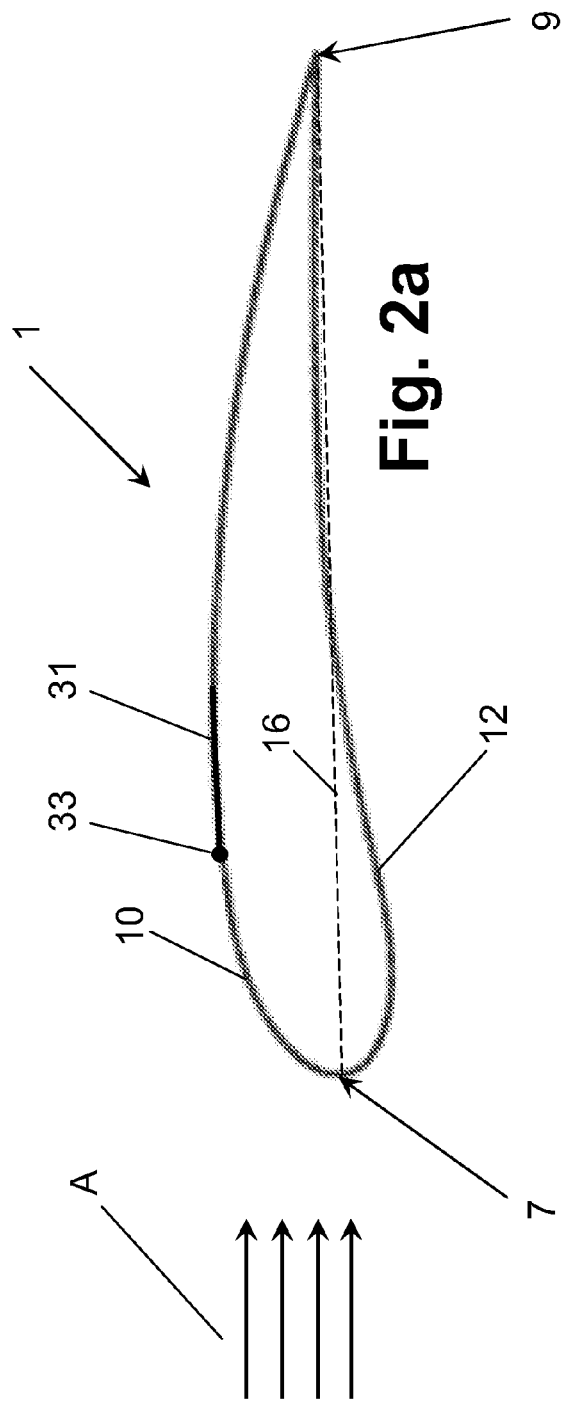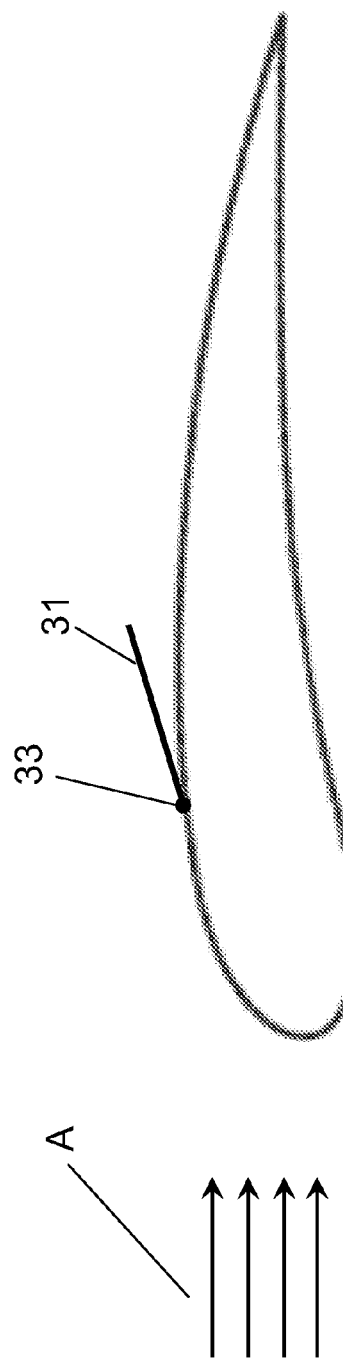

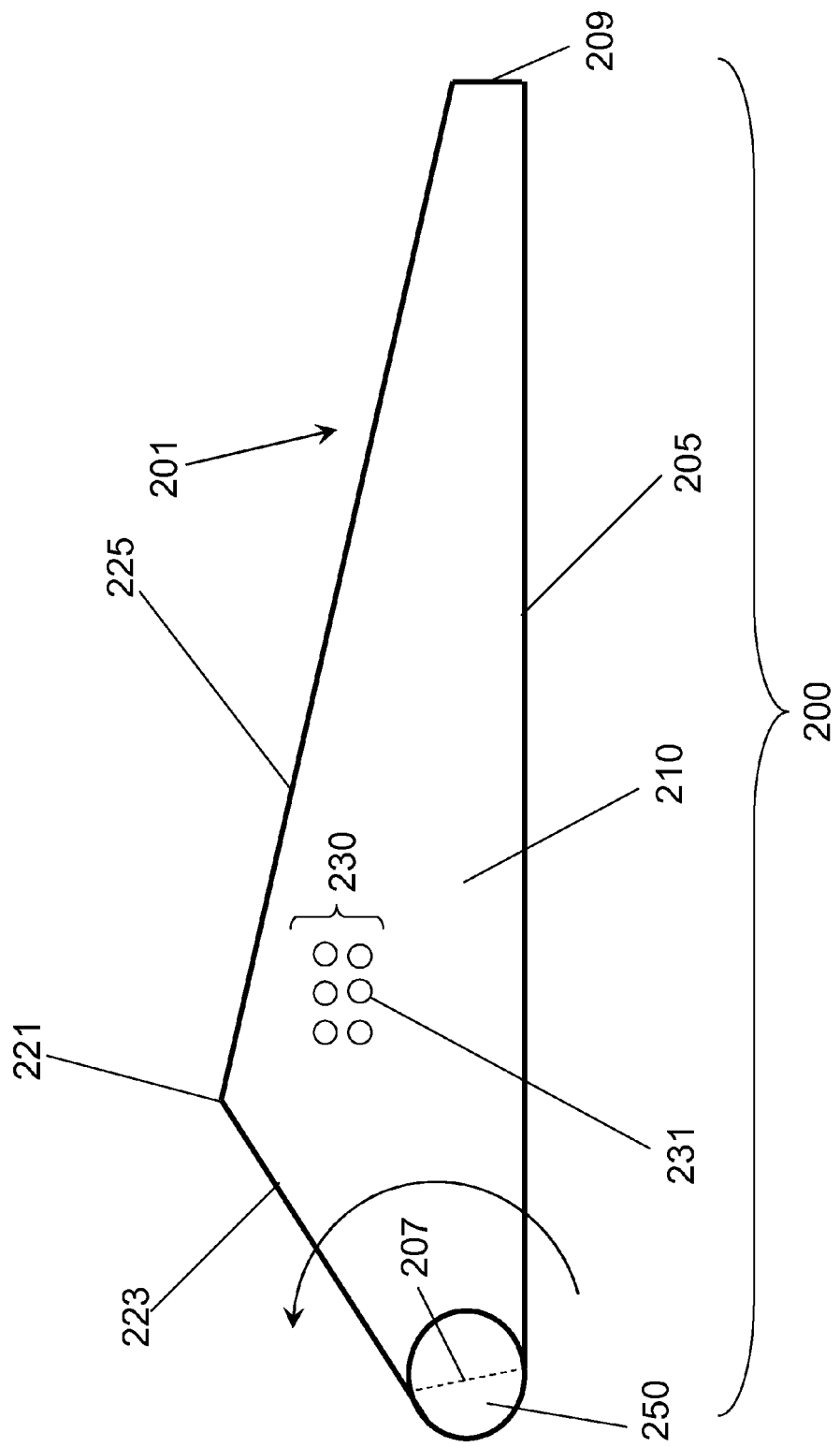

WING FOR GENERATING LIFT FROM AN INCIDENT FLOW

CROSS-REFERENCE TO RELATED APPLICATION

This application is the National Stage of International Application No. PCT/NL2011/050253, filed Apr. 14, 2011, which claims the benefit of NL 2004555, filed Apr. 15, 2010, the contents of which are incorporated by reference as if fully set forth herein.

FIELD OF THE DISCLOSURE

The present invention relates to a wing for generating lift from an incident flow.

BACKGROUND

Wings are well known in the state of art and may be used to generate lift for various purposes.

In aerial vehicles, such as aircrafts, wings are used for generating lift and stabilizing and controlling the aerial vehicle. A traditional aircraft comprises a fuselage, a main wing attached to the fuselage for providing lift, a horizontal tail wing and a vertical tail wing provided at the rear of the aerial vehicle primarily for providing stability and control.

In order to control the aerial vehicle, these wings may comprise control means to influence the incident flow that flows over the wings. Conventional control means are for example ailerons, flaps, spoilers or combinations thereof. These control means disturb the flow over the wing such that the lift of the wing changes, resulting in a change of force. This change of lift may result in the aerial vehicle to pitch, yaw or roll.

For an efficient pitch, yaw and roll the control means must generate a sufficient change of lift. This results in control means that have a relative large surface area. In order to actuate these control means, mechanisms are necessary that weigh significantly compared with a mass of the wing.

For large aircraft, such as disclosed in patent publication RU-2,266,233, the control means are located near a trailing edge of the wing and extend along a span of the wing.

For small aerial vehicles, in particular unmanned aerial vehicles (UAV), alternative means for controlling are used. Patent publication WO-2008/125868 shows a UAV having adjustable wings. The sweep and span of the main wing are adjustable in order to roll and yaw. The mechanisms for adjusting the wings are complicated and comprise various spars, actuators and hinges in the wing. This increases weight and therefore reduces the overall performance of the UAV.

Drawback of these wings is that relative heavy and elaborate control means may be necessary to generate a sufficient change of lift of the wing.

SUMMARY

It is an object of the present invention to eliminate at least one of the abovementioned drawbacks or to at least provide a usable alternative.

In particular, it is an object of the present invention to reduce the weight of a wing keeping sufficient controllability over the lift.

According to the invention the object of the invention is achieved by providing a wing for generating lift from an incident flow comprising a trailing edge, a leading edge, an inner end, an outer end, a top surface corresponding with a suction side and a bottom surface corresponding with a pressure side.

The lift may be defined as any force generated by the incident flow acting on the wing.

The incident flow may comprise of any flüidum. The flüidum may be a gas or a liquid of any composition. For example, the gas may be air or the liquid may be water, in particular seawater.

The incident flow may result from the flüidum moving with respect to the wing. Alternatively, the incident flow may result from the wing moving with respect to the flüidum.

The leading edge is located on a front end of the wing and separates the flow into an flow following the top surface and an flow following the bottom surface.

The trailing edge is located on a rear end of the wing where the separated flows rejoin after passing over the top surface and the bottom surface.

The inner end of the wing may face a root end of the wing. The outer end may face a tip end of the wing. The leading edge, trailing edge, inner end and outer end enclose the top surface and the bottom surface resulting in the top surface and bottom surface being separated surfaces.

The wing further comprises in cross section, an aerofoil with a chord line which is defined by a straight line between the leading edge and the trailing edge of the aerofoil.

The aerofoil is a shape of the wing as seen in cross section. The aerofoil may be of any shape. The shape of the aerofoil provides a lift distribution depending on the shape of the aerofoil. Aerofoils are well known and their shapes are often expressed in terms of NACA numbers.

The aerofoil is designed such that the top surface corresponds with the suction side being a lower pressure than the pressure at the bottom surface. The bottom surface corresponds with the pressure side being a higher pressure than the pressure at the top surface.

Preferably, the aerofoil is cambered such that the distance over the top surface between the leading edge and the trailing edge is larger than the distance over the bottom surface between the leading edge and the trailing edge.

This has as advantage that the wing may generate lift. A further advantage is that the cambered aerofoil may provide a volume between the top surface and the bottom surface which may be used for storage. For example, the volume may be used for guiding cables and wires and/or placing a control mechanism such as a control servo.

Seen in cross section, lift may also be generated by an angle of attack of the wing with respect to the incident flow. The angle of attack is an angle between the chord line of the wing and a vector representing a relative motion between the wing and the incident flow.

The wing also comprises a span direction that extends from the inner end towards the outer end which is perpendicular to the chord line.

A positive span direction is directed outwards from the inner end towards the outer end.

The leading edge comprises a kink between the inner end and the outer end.

Preferably, the kink has an angle smaller than 180 degrees and has an ^-shape pointing in a forward direction parallel to the chord line. The forward direction extends from the trailing edge towards the leading edge.

When the incident flow reaches the kink in the leading edge a kink vortex is generated which follows the top surface of the wing. The kink vortex is a spinning flow. The spinning flow may be turbulent or laminar. The kink vortex may be generated as a flow passing the kink at a side facing the inner end has a different pressure than a flow passing a side facing the outer end. The kink vortex delays flow separation between a flow and the top surface. Moreover, as the kink vortex contains more energy due to spinning of the flow, it attaches to the top surface and follows it towards the trailing edge. The kink vortex forms an additional surface to the top surface. This may result in a laminar flow over the kink vortex. The laminar flow has to travel a larger distance from the leading edge towards the trailing edge compared with when the kink vortex was not present. This results in a larger pressure difference between the top surface and bottom surface, resulting in an additional lift.

The leading edge furthermore comprises a forward sweep part between the inner end and the kink extending towards the kink presenting an angle relative to the span direction between 0° and 90°.

The leading edge comprises the forward sweep part that extends towards the kink and faces the inner end. A positive extension is defined from the inner end towards the kink and makes a positive angle with the span direction in a forward direction. The forward direction points upstream of the flow, i.e. in a direction from the trailing edge towards the leading edge.

In a further embodiment the angle of the forward sweep part relative to the span direction is between 0° and 60°, in a further embodiment between 0° and 45°, in a further embodiment between 0° and 30°, in a further embodiment between 5° and 30°.

The leading edge comprises a backward sweep part between the kink and the outer end extending from the kink presenting an angle relative to the span direction between 0° and −90°.

The leading edge comprises the backward sweep part that extends from the kink towards the outer end. A positive extension is defined from the kink towards the outer end makes a negative angle with the span direction in a backward direction. The backward direction point downstream of the flow, i.e. in a direction from the leading edge towards the trailing edge.

In a further embodiment the angle of the backward sweep part relative to the span direction is between 0° and −60°, in a further embodiment between 0° and −45°, in a further embodiment between 0° and −30°, in a further embodiment between −5° and −30°.

The top surface comprises a flow control means for controlling the lift at least partly located between a leading edge part between the kink and the outer end and located between the leading edge and the trailing edge.

Preferably, the angle of the kink is smaller than 180 degrees, i.e. the angle between the forward sweep part and the backward sweep part is smaller than 180 degrees.

Advantage is that the kink vortex may be generated which may result in the additional lift.

By placing the flow control means in the kink vortex, the additional lift may be controlled by the flow control means. As the kink vortex generates additional lift, disturbing the kink vortex by means of the flow control means may be optimal in terms of resulting change of lift.

As the kink vortex, generated by the kink, follows the top surface downstream of the kink, it may be most optimal to place the flow control means between the leading edge and the trailing edge, i.e. behind the leading edge part. Behind is defined as downstream towards the trailing edge. The leading edge part extends between the kink towards the outer end.

By controlling the flow, in particular by disturbing the kink vortex by means of the flow control means, the change of lift may be generated most optimally. Not only the lift generated by the aerofoil may be controlled but also the additional lift generated by the kink vortex may be controlled. This may result in smaller flow control means necessary to generate a same change of lift compared when the flow control means are located outside the kink vortex. Smaller flow control may result in weight reduction, reduction of complexity and reduction of costs while preserving sufficient controllability over the change of lift.

Preferably, the flow control means comprise a hinged surface.

The hinged surface in a first position forms a smooth surface with the top surface. In the first position the incident flow does not see irregularities in the top surface and the flow may follow the top surface. The hinged surface may be rotated into a second position wherein the hinged surface disturbs the top surface. For example, the hinged surface in the second position makes an angle larger than 0° with the top surface. The kink vortex sees this irregularity in the top surface resulting in a disturbed kink vortex resulting in a wing that does not provide additional lift from the kink vortex. Therefore, in the second position a change in lift occurs being a decrease of lift. This has as advantage that the change of lift may be controlled by using the hinged surface such that there may be no need for trailing edge flaps or ailerons.

Preferably, the forward sweep part is steeper than the backward sweep part. This results in the kink being located closer to the inner end than to the outer end. This has as advantage that the kink vortex, generated at the kink, may follow the top surface towards the trailing edge and the outer end. An outwards travelling kink vortex may result in a higher additional lift.

In an embodiment, the flow control means is located before the trailing edge. Before is defined as stream upwards with respect to the trailing edge, towards the leading edge. The flow control means is therefore located between the leading edge and the trailing edge. The flow control means is surrounded by the top surface. The flow control means are not a part of the trailing edge of the wing.

This has as advantage that the flow control means may be smaller and lighter compared to when they are located further away from the kink. The flow control means are nearer to an origin of the kink vortex resulting in a more effective control of the additional lift. This may result in smaller flow control means necessary while keeping a same or sufficiently controllability over the lift.

In an embodiment, the kink is located on substantially one third of a straight line between the inner end and the outer end wherein the straight line is parallel to the span direction.

Locating the kink on one third of this straight line results in a forward sweep part that is steeper than the backward sweep part. This results in a kink vortex that follows the top surface towards the outer end, namely towards the less steeper backward sweep part. This has as advantage that the kink vortex may be directed towards the outer end wherein sufficient space may be available to follow the top surface. The longer the kink vortex follows the top surface the more additional lift may be generated. In this embodiment, the location of the kink results in an optimal additional lift generated by the kink vortex and has as advantage that an optimal change of lift may be controlled by the flow control means.

In another embodiment, the forward sweep part presents a forward angle relative to the span direction between 5° to 40°.

This range of angles has as advantage that it may result in generating a significant kink vortex, i.e. a kink vortex which may comprise sufficient energy to follow the top surface.

In another embodiment, the backward sweep part presents a backward angle relative to the span direction between −5° to −40°.

This range of angles has as advantage that it may result in generating a significant kink vortex, i.e. a kink vortex which may comprise sufficient energy to follow the top surface.

In another embodiment, the flow control means is fully located behind the leading edge part between the kink and the outer end.

The flow control means comprised in the top surface are therefore located outwards, namely towards the outer end seen from the kink.

This is particularly advantageous for an outward travelling kink vortex. For this vortex it is not necessary to have flow control means that are partly located inwards, namely toward the inner end seen from the kink. This has as advantage that the flow control means may weigh less while keeping sufficient controllability over the lift.

Wing according to one of the preceding claims, wherein the flow control means is located between the leading edge and a reference line halfway the leading edge and the trailing edge.

The reference line divides the top surface between the leading edge and the trailing edge. Locating the flow control means between the reference line and the leading edge results in that the flow control means are closer to the leading edge than to the trailing edge.

This has as advantage that the kink vortex may be disturbed relatively nearby the kink. As the kink vortex travels downstream from the leading edge towards the trailing edge, the kink vortex may be disturbed relatively early by the flow control means. This may reduce the risk that the kink vortex does not travel over the flow control means which may result in a less effective controllability of the lift. Therefore, disturbing the kink vortex in an early stage may increase safety and certainty of controllability.

In an embodiment the flow control means comprises a hinged surface.

This has as advantage that the change of lift may be controlled by using the hinged surface such that there may be no need for trailing edge flaps or ailerons.

In a further embodiment the hinged surface is less than one tenth of the top surface. A maximum area of the hinged surface is therefore one tenth of the top surface.

This has as advantage that there may be no need for larger hinged surfaces as it may be sufficient to only disturb the kink vortex.

In another further embodiment the hinged surface covers more than one twentieth of the top surface. A minimum area of the hinged surface is therefore one twentieth of the top surface.

This has as advantage that with the minimum area of the hinged surface a significant weight reduction may be obtained compared to a trailing edge aileron stretching out over an entire span of the wing while keeping sufficient controllability of the change of lift.

Wing according to one of the preceding claims, wherein at the inner end the aerofoil is cambered and at the outer end the aerofoil is half symmetrical.

Starting at the inner end the aerofoil varies in shape towards the outer end along the span direction. The aerofoil is cambered at the inner end. A cambered aerofoil results in a curved top surface and a curved bottom surface both starting at the leading edge and ending at the trailing edge. The curvature at the top surface is larger than the curvature at the bottom surface resulting in the top surface being the suction side and the bottom surface being the pressure side. At the outer end the aerofoil is half symmetrical. A half symmetrical aerofoil results in a curved top surface and a flat bottom surface both starting at the leading edge and ending at the trailing edge. Again this results in the suction side at the top surface and the pressure side at the bottom side, resulting in lift.

An advantage of varying the aerofoil from the inner end to the outer end is that it may result in increased performance when the wing is accelerated or decelerated. For example, when the wing is suddenly accelerated by an increased translation and/or rotation, the flow over the top surface and the bottom surface may change significantly. Having a cambered profile at the inner end and a half symmetrical profile at the outer end may result in a stable flow near at least one of the ends during varying accelerations by the wing.

In another embodiment a thickness of the aerofoil decreases along the span direction towards the outer end.

The thickness of the aerofoil is, in cross section perpendicular to the span direction, the largest distance between the top surface and the bottom surface. By decreasing the thickness of the aerofoil the thickness of the wing is decreased.

This has as advantage that the kink vortex may be forced to travel outwards towards the outer end, i.e. towards a decreasing thickness of the wing. A further advantage is that a decreasing thickness of the wing may reduce the weight of the wing while keeping sufficient structural stability.

The present invention also relates to an aerial vehicle, comprising a wing for generating lift from an incident flow.

The aerial vehicle may be a manned or an unmanned aerial vehicle (UAV). Aerial vehicles are well known. There have been many attempts to emulate the flight of birds. In particular there have been many attempt to emulate a flapping wing of a bird. The wing of a bird has a free tip end and a root end that is rotatably fixed to a body of the bird. During flapping of the wing of a bird, three characteristic movements may be identified.

A first movement is a repeating upward and downward movement of the tip end while the root end is rotatably fixed to the body of the bird. During the first movement the wing of a bird rotates around an axis that is parallel to a chord line near the root end.

A second movement is a repeating positive and negative rotation around an axis parallel to a span direction. As the root end is rotatably fixed with the main body and the tip end is free, a torsion appears in the wing of the bird.

A third movement is a repeating inward and outward displacement of the tip end with respect to the root end. This third movement appears like a rowing movement.

For example, patent publication WO-2008/125868 shows a UAV that emulates the flight of birds. This publication shows an adjustable wing that is able to emulate the third movement, i.e. adjust a span and a sweep. The adjustment of the wings is also used to control the UAV, that is to roll and yaw the UAV.

In general, a control of an aerial vehicle comprises a control for rolling, yawing and pitching. Rolling corresponds with a rotation around a longitudinal axis. Yawing corresponds with a rotation around a vertical axis and pitching corresponds with a rotation around an orthogonal axis with respect to the vertical axis and the horizontal axis.

From other publications, aerial vehicles such as UAV's are known that are able to emulate the first- and the second movement. A change in frequency of the repeating movements are used for controlling the aerial vehicle, i.e. to roll and yaw the aerial vehicle.

Drawback of these aerial vehicles is that controlling is elaborate due to the dynamics of the flapping wings.

It is an object of the present invention to eliminate this drawback or at least provide a usable alternative.

In particular, it is an object of the present invention to simplify the control in terms of roll and yaw of the aerial vehicle.

According to the invention the object of the invention is achieved by providing an aerial vehicle, wherein the aerial vehicle comprises a frame and a flapping mechanism for flapping the at least one wing with respect to the frame.

The frame may be a main body of an artificial bird or any body which is suitable to comprise propulsion means, communication means, guidance- and control means, payload or any other means necessary for flight.

In an embodiment, the frame is a fuselage for comprising means necessary for flight inside of the fuselage.

In another embodiment, the frame may be any body for carrying means necessary for flight. Carrying of the means may be outside or inside of the body.

Advantage of this embodiment may be that a human person may be transported by air using a relatively low amount of energy compared to an airplane or helicopter. A further advantage is that the wings according to the invention may allow a lower noise than conventional fixed wing aerial vehicles. Propulsion by fixed wing aerial vehicles may need a propeller or turbine. Flapping the at least one wing may be done at a frequency that may be relative low. A movement of the flapping mechanism is lower compared to a movement of the propeller or turbine, which may result in a more energy efficient and lower noise propulsion.

Preferably, the frame is a backpack to be worn by a human person. This has as advantage that a safer transport of a human person may be possible.

The backpack provided with the flapping mechanism and the wings may allow a failsafe solution when a hazardous situation occurs. For example the hazardous situation comprises a malfunction of the propulsion. In such a situation the wings comprising the kink and the flow control means provide sufficient lift and control to safely fly the human person. When, in another example, the hazardous situation comprises contact between the human person and the wings, a force exerted on the human person is much lower than a force exerted on the human person by a propeller driven aerial vehicle. This may reduce the risk of crashing down.

The flapping mechanism is suitable to at least perform one of the first-, second and third movement.

The aerial vehicle further comprises at least one wing according to one of the proceeding embodiments.

Having a wing with a kink on a leading edge combined with flow control means that are suitable to disturb a kink vortex may offer the aerial vehicle increased control performance in terms of roll and yaw. A further advantage is that only a horizontal tale plane is necessary for pitching the aerial vehicle. The flow control means in combination with the kinked wing allows the aerial vehicle to perform a combined roll and yaw movement.

The present invention also relates to a blade for a rotary wing. In wind turbines rotary wings are used to drive a turbine. Often these rotary wings comprise of two or more blades that generate lift due to an incident airflow. When the incident airflow is large the rotary wings may rotate faster compared to when the airflow is smaller.

Drawback of these wind turbines is that braking or decreasing the rotational speed is energy consuming.

It is an object of the present invention to eliminate this drawback or at least provide a usable alternative.

In particular, it is an object of the present invention to brake or decrease the rotational speed more efficiently in terms of energy.

According to the invention the object of the invention is achieved by providing a blade for a rotary wing, comprising at least one wing according to one of the preceding embodiments, wherein the flow control means comprises an air hole for disturbing the flow.

A blade comprising a kink and the flow control means placed in the kink vortex may more efficiently decrease the rotational speed. By disturbing the kink vortex less lift is generated resulting in braking or decreasing the rotational speed.

The present invention also relates to the use of a wing according to any of the foregoing embodiments.

These and further embodiments of and the method according to the invention are captured in the dependent claims.

BRIEF DESCRIPTION OF THE DRAWINGS

These and other aspects, characteristics and advantages of the present invention will be explained in more detail by means of the following description of embodiments of the wing, in which identical reference numerals denote identical components, and in which:

FIG. 1 shows a plan view of a wing according to the invention.

FIG. 2a shows a first cross sectional view of the wing showing an aerofoil of the wing comprising a flow control means in a first position.

FIG. 2b shows a cross sectional view of the wing showing the aerofoil of the wing comprising the flow control means in a second position.

FIG. 4 shows another embodiment of the invention, wherein the wing according to the invention is a blade comprised in a rotary wing such as used in a wind turbine.

DETAILED DESCRIPTION

Figure 3:
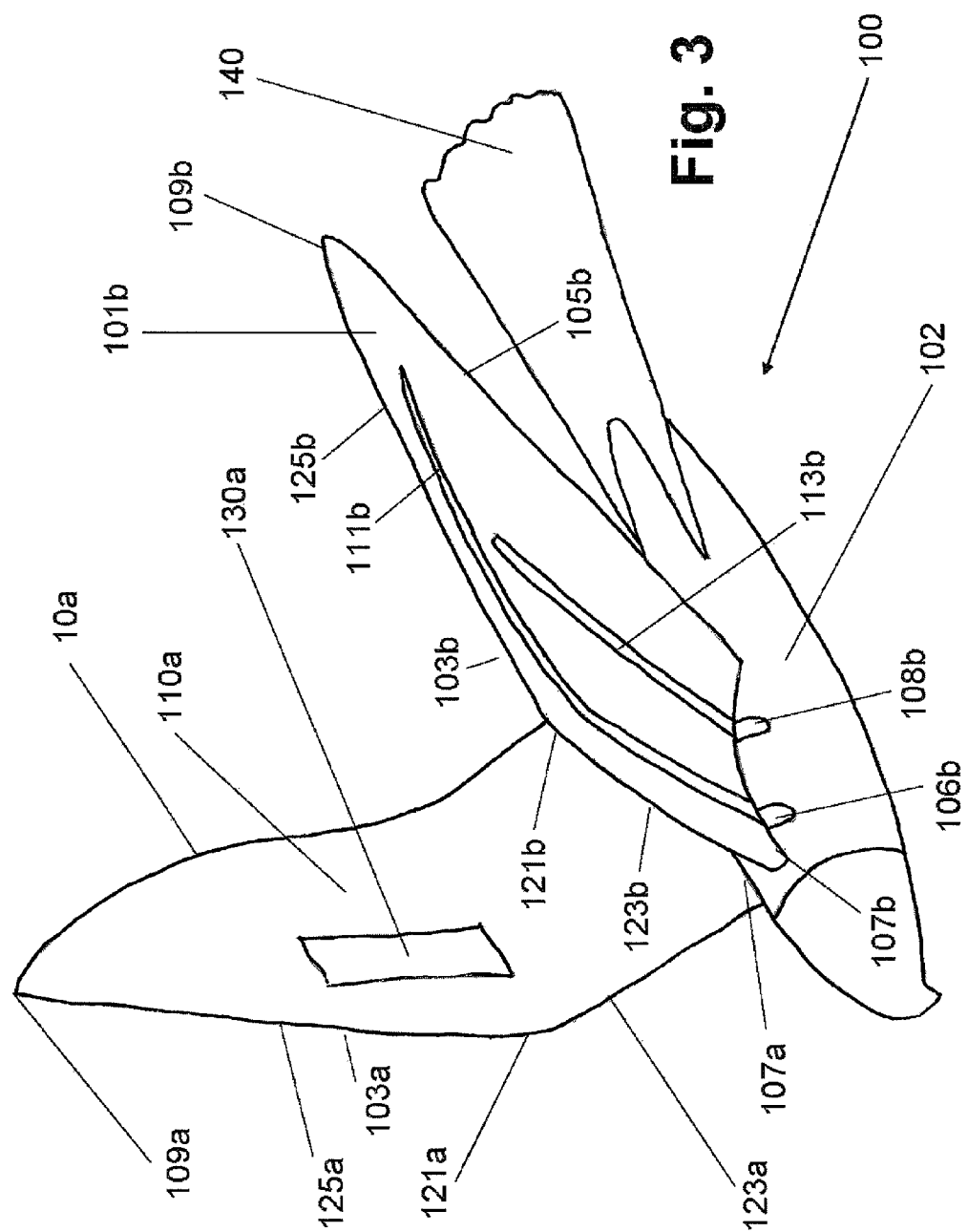
FIG. 3 shows an embodiment of the invention, wherein the wing according to the invention is comprised in an unmanned aerial vehicle being an artificial bird.

FIG. 1 shows a wing 1 which may generate lift from an incident flow A. The incident flow A may be an airflow, a fluid flow a gas flow or any flüidum flow. FIG. 1 is a plan view or top view. The wing 1 comprises a leading edge 3, a trailing edge 5, an inner end 7 and an outer end 9. A top surface 10 is shown which is an area enclosed by the leading edge 3, the trailing edge 5, the inner end 7 and the outer end 9. Note, that the inner end 7 and the outer end 9 both are edges between the leading edge 3 and the trailing edge 5.

Not shown in FIG. 1 is a bottom surface 12, which is opposite of the top surface 10. Also the bottom surface 12 is enclosed by the leading edge 3, the trailing edge 5, the inner end 7 and the outer end 9.

The top surface 10 corresponds with a suction side of the wing 1 and the bottom surface 12 corresponds with a pressure side of the wing. This means that the pressure at the suction side is lower than the pressure at the bottom surface resulting in a lift. The lift is a force that is directed upwards, i.e. pointing from the bottom surface 12 towards the top surface 10.

In cross section, shown in FIG. 2a and FIG. 2b, an aerofoil 14 is shown with a cambered shape. The aerofoil 14 comprises a chord line 16 which is a straight line between the leading edge 3 and the trailing edge 5. The leading edge 3 of the aerofoil 14 coincides with a stagnation point on a nose of the wing 1. The stagnation point is the point where a local velocity of the flow is zero. The leading edge 3 and the trailing edge 5 divides the top surface 10 and the bottom surface 12.

Also shown in FIG. 1 is a span direction 20 that extends from the inner end 7 towards the outer end 9. The span direction 20 is perpendicular to the chord line 16.

FIG. 1 shows a kink 21 on the leading edge 3 between the inner end 7 and the outer end 9. The kink 21 generates a kink vortex B as a result of the flow A over the wing 1. The kink 21 results from the leading edge 3 having a forward sweep part 23 and a backward sweep part 25. The forward sweep part 23 is located between the inner end 7 and the kink 21 and the backward sweep part 25 is located between the kink 21 and the outer end 9. Forward is defined as a direction pointing from the trailing edge 5 towards the leading edge 3.

The forward sweep part 23 of the leading edge 3 presents a forward angle α relative to the span direction 20. This forward angle α preferably has a value between 0° and 90°.

The backward sweep part 25 of the leading edge 3 presents a backward angle β relative to the span direction 20. This backward angle β preferably has a value between 0° and −90°.

The forward sweep part 23 and the backward sweep part 25 make a kink angle γ facing the kink vortex B and the trailing edge 5. Note that the absolute values of the forward angle α, the backward angle β and the kink angle γ equal 180°.

Preferably, the kink angle γ is smaller than 180°.

FIG. 1 further shows the top surface 10 comprising a flow control means 30. The flow control means 30 being a hinged surface 31 also shown in FIGS. 2a and 2b. The hinged surface 31 may comprise a hinge 33 that allows the hinged surface 31 to be rotated from a first position to a second position. The first position corresponds to the hinged surface 31 being smoothly aligned with the top surface 10 as shown in FIG. 2a. The second position corresponds with the hinged surface 31 being in an upward position relative to the top surface 10 as shown in FIG. 2b. In the second position the hinged surface 31 disturbs the flow A over the top surface 10. In FIG. 1 the hinge 33 comprises a line or piano hinge. The hinged surface 31 may be of any arbitrary shape. In FIG. 1 the hinged surface 31 is square shaped, but also other shapes are possible and foreseen, such as a triangular shape or a round shape.

When the flow control means 30 is placed at least partly behind a leading edge part 35 between the kink 21 and the outer end 9, the flow control means 30 may be used to influence the kink vortex B.

This has as advantage that the kink vortex B may be disturbed resulting in a change of the lift. When the kink vortex B is disturbed the lift may be decreased. When the kink vortex B is used to vary the lift of the wing 1 there may be no need to use conventional ailerons to control the wing 1.

FIG. 3 shows an embodiment of the invention, wherein two wings 101a, 101b according to the invention are comprised in an unmanned aerial vehicle 100 being an artificial bird.

Note, that the described elements in this embodiment may be combined with corresponding described elements in the previous embodiment.

Again, in FIG. 3 a first wing 101a and a second wing 101b are rotatably attached to a fuselage 102. The fuselage 102 may have the shape of a main body of a bird. The first wing 101a is symmetrical with respect to the second wing 101b, wherein the line of symmetry is parallel to an inner end 107a of the first wing 101a and an inner 107b end of the second wing 101b.

The wings 101a, 101b comprise a leading edge 103a, 103b, a trailing edge 105a, 105b, an inner end 107a, 107b and an outer end 109a, 109b. A top surface 110a is enclosed by the leading edge 103a, 103b, the trailing edge 105a, 105b, the inner end 107a, 107b and the outer end 109a, 109b.

The leading edge 103a, 103b comprises a kink 121a, 121b, a forward sweep part 123a, 123b and a backward sweep part 125a, 125b.

When the unmanned aerial vehicle 100 flies in an atmosphere the kink 121a, 121b may generate a kink vortex that travels over the top surface 110a, 110b towards the trailing edge 105a, 105b.

By placing a flow control means 130a, 130b behind a leading edge part the flow control means 130a, 130b may disturb the kink vortex. The leading edge part lies between the kink 121a, 121b and the outer end 109a, 109b.

The two wings 101a, 101b may flap with respect to the fuselage 102 being in a shape of a main body of a bird. Flapping may be defined by three movements.

A first movement is a repeating upward and downward movement of the inner end 107a, 107b while the outer end 109a, 109b is rotatably fixed to the fuselage 102. During the first movement the wings 101a, 101b rotate around an axis that is parallel to a chord line near the inner end 107a, 107b.

A second movement is a repeating positive and negative rotation around an axis parallel to a span direction. As the inner end 107a, 107b is rotatably fixed with the fuselage 102 and the outer end 109a, 109b is free, a torsion appears in the wing 101a, 101b of the unmanned aerial vehicle 100.

A third movement is a repeating inward and outward displacement of the inner end 107a, 107b with respect to the outer end 109a, 109b. This third movement appears like a rowing movement.

The embodiment shown in FIG. 3 only comprises the first movement and the second movement.

The first movement is provided by a flapping mechanism comprising a first pivot 106b and a second pivot 108b. The first pivot 106b is rotatably attached to first spar 111b and the second pivot 108b is rotatably attached to a second spar 113b. The first pivot 106b and the second pivot 108b may be actuated independently by separate servos. When the first pivot 106b is periodically actuated out of phase with the second pivot 108b the first movement and the second movement are generated. Actuating the first pivot 106b upwards results in the first spar 111b moving upwards. At the same time the second pivot 108b moves downwards resulting in the second spar 113b moving downwards. As the first spar 111b and the second spar 113b are provided to the wing 101b, the wing 101b generates the first movement and the second movement. Note, that the wings 101a, 101b comprise of a flexible material.

Particularly, in a dynamic flapping wing configuration, controlling an unmanned aerial vehicle may be difficult. It is therefore advantageous to make use of controlling the unmanned aerial vehicle 100 by means of the flow control means 130a, 130b. The kink vortex generated at the kink 121a, 121b is controllable even when the wings 101a, 101b of the unmanned aerial vehicle 100 flap. It may be more unreliable in terms of control and stability to control a flapping unmanned aerial vehicle 100 by means of ailerons located at a trailing edge.

The unmanned aerial vehicle further comprises a horizontal tale wing 140 for stabilizing a pitching rotation of the unmanned aerial vehicle 100.

FIG. 4 shows another embodiment of the invention, wherein the wing according to the invention is a blade 201 comprised in a rotary wing 200 such as used in a wind turbine.

Note, that the described elements in this embodiment may be combined with corresponding described elements in the previous embodiments.

The blade 201 comprises a leading edge 203, a trailing edge 205, an inner end 207 and an outer end 209. Furthermore, the leading edge 203 comprises a kink 221 a forward sweep part 223 and a backward sweep part 225. In a top surface 210 a flow control means 230 is comprised to disturb a kink vortex that is generated by the kink 221 due to an incident flow. The rotary wing comprises the blade 201 and a rotor 250 that drives a turbine. The flow control means 230 comprise air holes 231 that may suck or blow air into an atmosphere. This way, the kink vortex may be disturbed and the lift generated by the blade 201 may be influenced in a controlled manner. The lift generated by the blade 201 is representative to a rotational speed of the rotary wing 200. The rotary wing may comprise at least one blade 201.

By having 231 air holes provided in the blade 201 the rotational speed of the rotary wing 200 may be controlled, providing an energy efficient control of the rotary wing 200.

The invention is not limited to the described embodiments. Any combination of the described embodiments are possible and foreseen.

The wing according to the invention may be used in various devices such as spoilers, marine propellers and sails.

The invention also relates to these devices comprising a wing according to any of the foregoing embodiments.

In an alternative, the wing as described in any of the foregoing embodiments is comprised in a spoiler for spoiling the incident flow of a moving vehicle. The spoiler according to the invention has as advantage that the incident flow may be spoiled or disturbed more accurately. The flow control means may allow the spoiler to control the additional lift generated by the kink vortex. A more accurate control of the lift generated by the spoiler may result in a more effective grip of the moving vehicle. For example, the moving vehicle requires more grip on a road in a first situation. By controlling the flow control means the grip on the road may be adjustable to a second situation.

In a further alternative, the wing as described in any of the foregoing embodiments is comprised in a marine propeller for propelling a marine vehicle.

The marine propeller according to the invention has as advantage that propelling the marine vehicle may be more efficient in terms of energy. The lift generated by the wing is used as a propelling force. Additional lift generated as a result of the kink is equivalent to an additional propelling force. This additional propelling force may be controlled by the flow control means.

Alternatively, the wing as described in any of the foregoing embodiments is comprised in a sail for generating a sail force.

The sail according to the invention has as advantage that an additional sail force may be generated that may be controlled by the flow control means.

Alternatively, the flow control means may be used for controlling a change of lift wing and/or change a pressure distribution at the top surface and/or breaking the wing with respect to the incident flow and/or breaking the wing with respect to an inertial reference.

The inertial reference may for example be the Earth. Breaking is defined as decreasing a relative velocity with respect to the inertial reference.

The invention claimed is:

1. A wing for generating lift from an incident flow comprising;
    a trailing edge, a leading edge, an inner end, an outer end, a top surface corresponding with a suction side and a bottom surface corresponding with a pressure side;
    in cross section, an aerofoil with a chord line which is defined by a straight line between the leading edge and the trailing edge of the aerofoil;
    a span direction that extends from the inner end towards the outer end which is perpendicular to the chord line;
    wherein the leading edge further comprises;
    a kink between the inner end and the outer end configured to generate a kink vortex to provide an additional lifting force in which the incident flow reaching the kink in the leading edge generates the kink vortex which travels over the top surface towards the trailing edge;
    a forward sweep part between the inner end and the kink extending towards the kink, wherein the forward sweep part presents a forward angle relative to the span direction between 5° and 40°;
    a backward sweep part between the kink and the outer end extending from the kink, wherein the backward sweep part presents a backward angle relative to the span direction between −5° and −40°;
    wherein the top surface comprises a flow control means for controlling the lift wherein the flow control means is at least partly located between a leading edge part between the kink and the outer end and located between the leading edge and the trailing edge, wherein the flow control means is positioned in the generated kink vortex to disturb the additional lifting force provided by the kink vortex.

2. A wing according to claim 1, wherein an angle of the kink is smaller than 180°.

3. A wing according to claim 1, wherein the kink is located on substantially one third of a straight line between the inner end and the outer end wherein the straight line is parallel to the span direction.

4. A wing according to claim 1, wherein the flow control means is fully located behind the leading edge part between the kink and the outer end.

5. A wing according to claim 1, wherein the flow control means is located between the leading edge and a reference line halfway the leading edge and the trailing edge.

6. A wing according to claim 1, wherein the flow control means comprises a hinged surface.

7. A wing according to claim 6, wherein the hinged surface is less than one fifth of the top surface.

8. A wing according to claim 6, wherein the hinged surface covers more than one tenth of the top surface.

9. A wing according to claim 1, wherein at the inner end the aerofoil is cambered and at the outer end the aerofoil is half symmetrical.

10. An aerial vehicle, comprising at least one wing according to claim 1, wherein the aerial vehicle further comprises;
    a frame, in which the wing has a free tip end and a root end which is rotatably fixed to the frame;
    a flapping mechanism for flapping the at least one wing with respect to the frame, in which the flapping mechanism allows a first movement of the wing which is a repeating upwards and downwards movement of the tip end while the root end is rotatably fixed to the frame, such that the wing rotates around an axis that is parallel to a chord line near the root end, in which the flapping mechanism allows a second movement of the wing which is a repeating positive and negative rotation around an axis parallel to the span direction, in which the flapping mechanism allows a third movement which is a repeating inward and outward displacement of the tip end with respect to the root end.

11. An aerial vehicle according to claim 10, wherein the wing further comprises a flow control actuator arranged between the top surface and the bottom surface.

12. A blade for a rotary wing, comprising at least one wing according to claim 1, wherein the flow control means comprises an air hole for disturbing the flow.

13. A wing according to claim 5, wherein the flow control means comprises a hinged surface.

14. A wing according to claim 13, wherein the hinged surface is less than one fifth of the top surface.

15. A wing according to claim 1,
the flow control means is fully located behind the leading edge part between the kink and the outer end; and
the flow control means comprises a hinged surface.

16. A wing according to claim 1, wherein at the inner end the aerofoil is cambered and at the outer end the aerofoil is half symmetrical.

* * * * *